Figure 2:
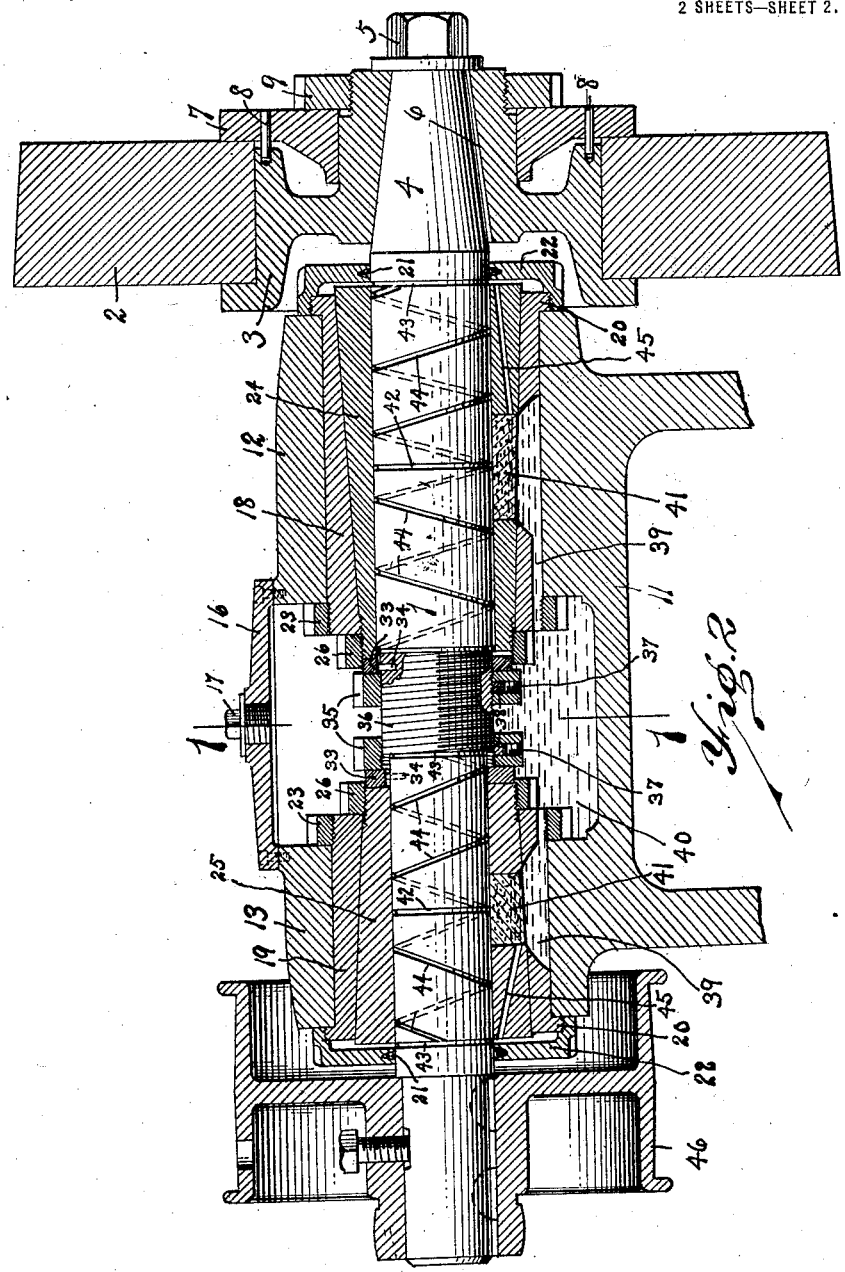

E. SOBOLEWSKI.
SHAFT BEARING.
APPLICATION FILED JULY 26, 1920.
1,408,837.
Patented Mar. 7, 1922.
2 SHEETS—SHEET 1.
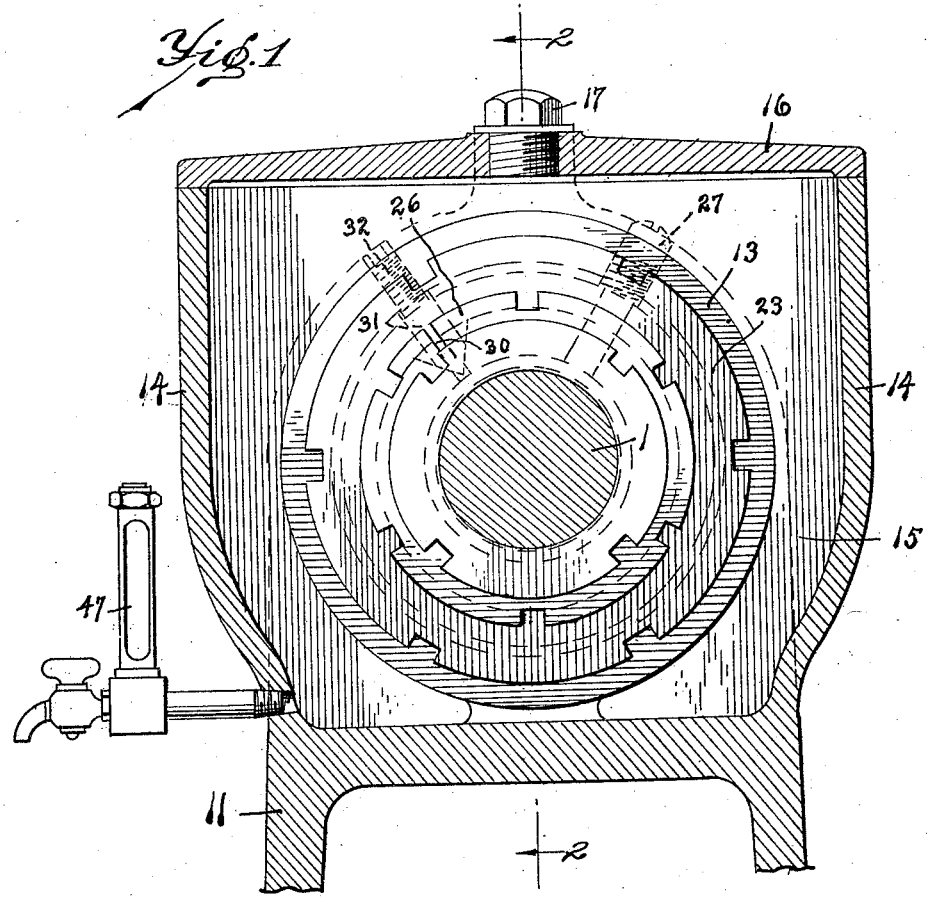
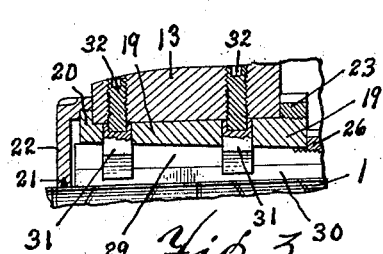
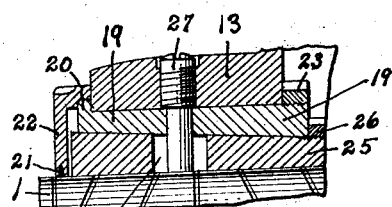
WITNESS:
INVENTOR
Edward Sobolewski.
BY
Edward N. Pagelsen
ATTORNEY

E. SOBOLEWSKI.
SHAFT BEARING.
APPLICATION FILED JULY 26, 1920.

1,408,837.

Patented Mar. 7, 1922.
2 SHEETS—SHEET 2.

WITNESS:

INVENTOR
Edward Sobolewski.
BY
Edward N. Pagelsen
ATTORNEY

UNITED STATES PATENT OFFICE.

EDWARD SOBOLEWSKI, OF DETROIT, MICHIGAN, ASSIGNOR TO DETROIT MACHINE TOOL COMPANY, OF DETROIT, MICHIGAN, A CORPORATION OF MICHIGAN.

SHAFT BEARING.

1,408,837.

Specification of Letters Patent.  Patented Mar. 7, 1922.

Application filed July 26, 1920. Serial No. 399,000.

*To all whom it may concern:*

Be it known that I, EDWARD SOBOLEWSKI, a citizen of the United States, and residing at Detroit, in the county of Wayne and State of Michigan, have invented a new and Improved Shaft Bearing, of which the following is a specification.

This invention relates to bearings for arbors for emery wheels and other grinders and cutters, and other shafts, and its object is to provide a construction of this character which will prevent endwise movement of the shaft and at the same time prevent objectionable end-thrust in the bearings.

This invention consists in a pair of bearings and a shaft mounted therein, and adjustable means on the shaft between the bearings to prevent endwise movement of the shaft.

It also consists in a pair of bearings embodying split conical bushings tapering toward each other, and means on their smaller ends to adjust them longitudinally and diametrically.

It further consists of the details of construction illustrated in the accompanying drawings and particularly pointed out in the claims.

In the drawings, Fig. 1 is a transverse section of an arbor and its mounting on the line 1—1 of Fig. 2, on a larger scale. Fig. 2 is a section on the line 2—2 of Fig. 1, on a smaller scale. Figs. 3 and 4 are sections on the lines 3—3 and 4—4 of Fig. 1 respectively.

Similar reference characters refer to like parts throughout the several views.

The shaft or arbor 1 shown in the drawings is slipped into its bearings from the right in Fig. 2 which is possible because its diameter adjacent the cutting or grinding wheel 2 is greater than elsewhere. A spool 3 mounted on the tapering end 4 of this arbor is held in position by a nut 5 and is driven by a key 6. The ring 7 is positioned by pins 8 and held in position on the hub of this spool by a nut 9. Any other desired means may be employed to mount the wheel 2 on the arbor.

The frame 11 for the arbor is provided with a pair of cylindrical bearing supports 12 and 13 which are connected by the sides 14 of an oil receptacle which preferably is integral with the frame 11 and comprises end walls 15 that unite with the bearing supports. A cover 16 extends between the sides 14 and end walls 15 and is secured thereto and is preferably provided with a filler plug 17.

Within the supports 12 and 13 are the sleeves 18 and 19 provided with conical bores tapering inwardly. The outer end of each sleeve may have a threaded flange 20 adapted to receive a cap 22 provided with a groove to receive a packing ring 21 which bears upon the arbor and prevents leakage of lubricant. The inner end of each sleeve is externally threaded to receive the nut 23, which, when screwed down onto the bearing support together with the flange 20, holds the sleeve rigidly in position.

Within these sleeves are the conical bearing bushings 24 and 25, each threaded on its inner end to receive a nut 26 whereby the bushings may be moved endwise in the sleeves. Each sleeve 18 and 19 is provided with a hole and each bushing 24 and 25 is provided with a slot to receive the inner ends of the pins 27 mounted in the bearing supports and whereby they are prevented from turning. The slots 28 in the bearing bushings are of sufficient length to permit the bushing to be moved endwise. These bushings are formed with V grooves 29 which end in radial slits 30 which thus split these bushings longitudinally. As indicated in Figs. 1 and 3, wedge blocks 31 fit in these grooves and are held in position by the screws 32 mounted in the bearing supports.

As the bushings are moved inwardly they are contracted because of their outer conical bearing surfaces. To prevent them from contracting more rapidly than desired these wedges are positioned in the V shaped grooves 29 and the screws 32 and wedge blocks 31 must be withdrawn before the bushing can be contracted.

A bearing collar 33 is mounted on the arbor to engage the inner end of each bearing bushing and is caused to turn with the arbor in any desired manner, pins 34 extending into notches in the inner walls of these collars being shown. Nuts 35 on the threaded central portion 36 of the arbor engage these collars and as these collars turn with the arbor, there is little danger of the nuts 35 turning after they are adjusted, but this danger may be avoided by using the screws 37 and bearing blocks 38 which engage the arbor.

I have shown the sleeves 18 and 19 provided with oil passages 39 communicating with the reservoir 40 and these passages communicate with pieces 41 of felt or other oil absorbent material mounted in slots in the bottoms of the bearing bushings. The lubricant will thus be supplied to the middle portions of the journals on the shaft and will be carried from the central oil grooves 42 to the end grooves 43 by means of the helical grooves 44. The passages 45 in the bearing bushings convey the oil, which gathers between the bearings and the caps 22, back to the passages 39. A pulley 46 is shown mounted on the arbor to drive it and an oil gauge 47 may be supplied if desired.

When arbors and other shafts have become warmed up, they expand longitudinally, and the collars which are to prevent them from moving endwise are usually so far apart that an appreciable increase in the distance between them results from this expansion. But in the present case, the distance between the nuts 35 on the middle portion of the shaft is so small, that the increase in the distance between their outer faces may be neglected. The portions of the arbor on each side of the nuts 35 are free to move endwise in the bearings. As the pads 41 extend into the lubricant, the journals of the arbor will always be properly lubricated and heating of the arbor be held at a minimum.

The sizes and proportions of the various parts of the structure thus explained may all be changed by those skilled in the art without departing from the spirit of my invention as set forth in the following claims.

I claim:—

1. The combination with a shaft having a pair of journals and a threaded portion between the journals, a pair of adjustable bearings for said journals, and nuts on the threaded portion of the shaft engaging the inner ends of the bearings to prevent endwise movement thereof in the bearings.

2. The combination with a shaft having a pair of journals and a threaded portion between the journals, a pair of nuts on said threaded portion, a frame and a pair of bearing supports thereon, adjustable bearings mounted in said supports, each consisting of a sleeve having a tapering bore, and a bearing bushing fitting said sleeve, the nuts engaging the inner ends of the sleeves to prevent endwise movement of the shaft.

3. The combination with a shaft having a pair of journals and a threaded portion between the journals, a pair of nuts on said threaded portion, a frame and a pair of bearing supports thereon, adjustable bearings mounted in said supports, each consisting of a sleeve having a tapering bore and a bearing bushing fitting said sleeve, said bushings have their exterior surfaces tapering toward each other and their smaller ends threaded, and nuts on said smaller ends to adjust the bushings.

4. The combination with a shaft having a pair of journals and a threaded portion between the journals, a pair of nuts on said threaded portion, a frame and a pair of bearing supports thereon, adjustable bearings mounted in said supports, a collar between each nut and the adjacent end of the bearing, and means to cause said collars to rotate with the shaft.

5. The combination with a shaft having a pair of journals and a threaded portion between the journals, a pair of nuts on said threaded portion, a frame and a pair of bearing supports thereon, and adjustable bearings mounted in said supports, each consisting of a sleeve having a tapering bore, a split bearing bushing fitting said sleeve, a wedge entering the slit in the bushing, and a screw to adjust the wedge and thereby control the inner diameter of the bearing.

6. The combination with a shaft having a pair of journals, a frame and a pair of bearing supports thereon, an oil receptacle connecting said supports, a bearing sleeve and an adjustable bearing bushing for each support and journal, each sleeve and bushing having a slot in its lower portion extending to the shaft, and pads of absorbent material mounted in said slots and extending from the oil in the receptacle to said shaft.

7. The combination with a shaft having a pair of journals, a frame and a pair of bearing supports thereon, an oil receptacle connecting said supports, a bearing sleeve and an adjustable bearing bushing for each support and journal, each sleeve and bushing having a slot in its lower portion extending to the shaft, pads of absorbent material mounted in said slots and extending from the oil in the receptacle to said shaft, said journals being formed with circumferential and helical oil grooves, and oil retainers on the outer ends of the bearing sleeves provided with packing rings engaging the shaft outside of said journals.

8. The combination with a shaft having a pair of journals and a threaded portion between the journals, a pair of nuts on said threaded portion, a frame and a pair of bearing supports thereon, adjustable bearings mounted in said supports, each consisting of a sleeve having a tapering bore and a bearing bushing fitting said sleeve, a flange on the outer end and a nut on the inner end of each bearing sleeve to secure the sleeves in position in the supports, and a nut on the inner end of each bearing sleeve to adjust the same longitudinally and diametrically.

9. The combination with a shaft having a pair of journals and a threaded portion between the journals, a pair of nuts on said threaded portion, a frame and a pair of bearing supports thereon, adjustable bearings mounted in said supports, each consisting of a sleeve having a tapering bore and a bearing bushing fitting said sleeve, said sleeves and bushings being provided with registering holes, and pins extending inwardly from the supports into said holes to prevent the sleeves and bushings from turning.

10. The combination with a shaft having a pair of journals, a grinding wheel on one end of the shaft and a pulley on the other end of the shaft outside of said journals, said shaft being threaded the entire distance between said journals, and a pair of nuts on said threaded portion to prevent endwise movement of the shaft in said journals.

EDWARD SOBOLEWSKI.